United States Patent [19]

Bartholomew

[11] Patent Number: 4,852,239

[45] Date of Patent: Aug. 1, 1989

[54] METHOD OF AFFIXING A RING TO PLASTIC PIPE

[75] Inventor: Donald D. Bartholomew, Marine City, Mich.

[73] Assignee: Proprietary Technology, Inc., Southfield, Mich.

[21] Appl. No.: 112,827

[22] Filed: Oct. 26, 1987

[51] Int. Cl.$^4$ .................... B21D 39/00; B23P 11/00
[52] U.S. Cl. ........................ 29/520; 29/237; 138/172; 285/382
[58] Field of Search .............. 29/520, 516, 237; 285/382.1, 382.2, 382; 138/172

[56] References Cited

U.S. PATENT DOCUMENTS

| | | | |
|---|---|---|---|
| 2,026,055 | 12/1935 | Nelson | 29/520 UX |
| 2,991,899 | 7/1961 | Montalbano | 285/382 X |
| 3,172,428 | 3/1965 | Tudge | 138/172 |
| 3,744,123 | 7/1973 | Vers | 29/520 |
| 4,226,449 | 10/1980 | Cole | 285/382.2 |

FOREIGN PATENT DOCUMENTS

| | | | |
|---|---|---|---|
| 35100 | 1/1965 | Fed. Rep. of Germany | 29/520 |
| 677125 | 8/1952 | United Kingdom | 285/382 |

*Primary Examiner*—Charlie T. Moon
*Attorney, Agent, or Firm*—Harness, Dickey, Pierce

[57] ABSTRACT

A concept for providing bands or rings which may be quickly and securely attached to plastic pipe as shown. The bands provide well anchored annular external flanges along the length of a section of pipe to facilitate coupling and sealing or to provide means for locating a pipe with reference to structures or devices. Rings that may be installed over the free end of a pipe and rings that may be opened to assemble over an already installed and coupled pipe are shown. Simple tooling for setting the ring is shown. This tooling is easily used in the field and in limited space, and may be hand operated.

3 Claims, 2 Drawing Sheets

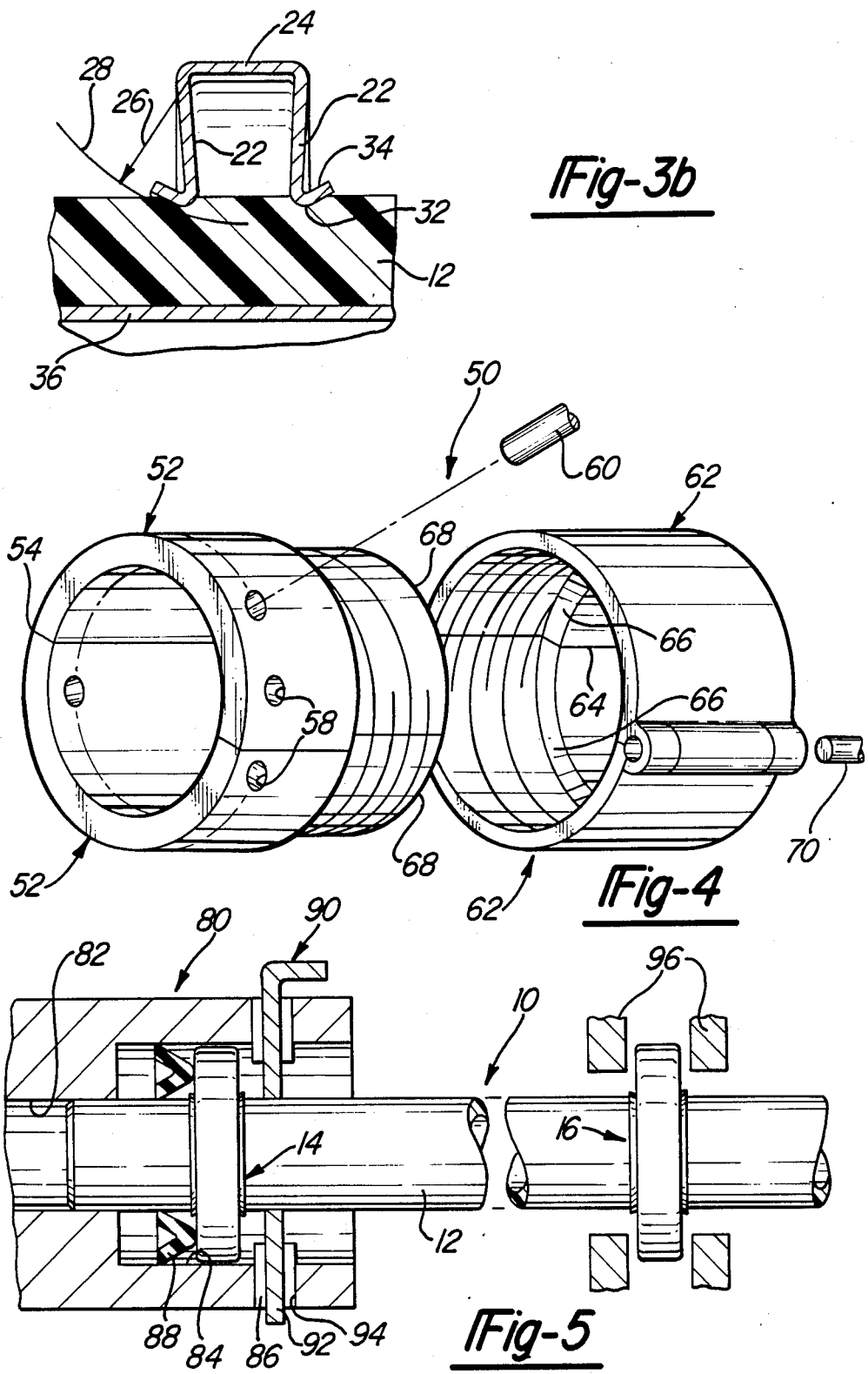

METHOD OF AFFIXING A RING TO PLASTIC PIPE

BACKGROUND OF THE INVENTION

The most desirable material for piping as a material that is low weight, tough, unaffected by chemicals, and is resistant to the pressure and temperature and mechanical circumstances of the application.

Various plastics are used today in many piping applications, but the best material candidates have properties that are so good for the application that coupling the ends and locating them become such a problem that they are often not used, or a significant cost penalty is incurred to couple or locate the piping.

Where simple gluing or hot forming are difficult to impossible, these best materials cannot be used in some of high quantity applications because of the difficulty of reliably coupling and locating the pipe.

The means disclosed herein provide a very well anchored external annular ring around the pipe that is inexpensive, and may be easily and reliably installed at the point of use by people who are cutting and fitting the pipe. The external ring, once assembled to the pipe, makes possible a number of very easily installed and low cost means for coupling, sealing, and locating the pipe. The figures show a number of these means along with an explanation of how the ring is anchored to the pipe without damaging the pipe in a way that weakens the pipe.

DESCRIPTION OF THE DRAWING

FIG. 3(b) is a cross-sectional view of a deformed ring on a plastic pipe;

FIG. 4 is a perspective view of a tool for deforming a ring; and

FIG. 5 is a cross-sectional view a pipe joint.

DESCRIPTION OF THE INVENTION

Figure 1:
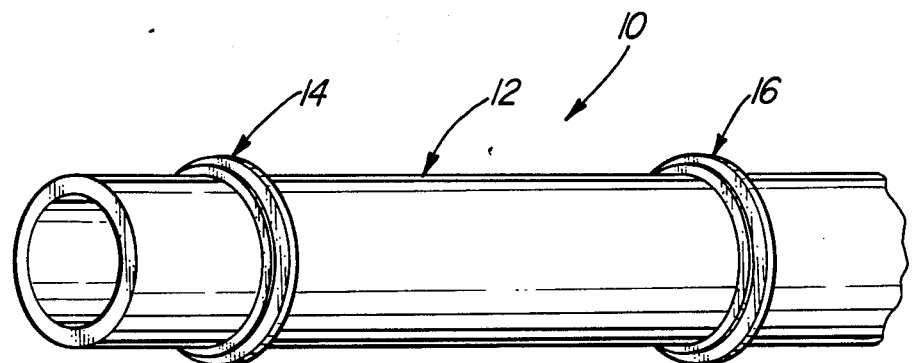
FIG. 1 is a perspective view of a plastic pipe with rings mounted thereon.

FIG. 1 shows a length of plastic pipe 10 with two rings attached. Rings 14 and 16 are attached to pipe 12.

Figures 2A, 2B, 2C:
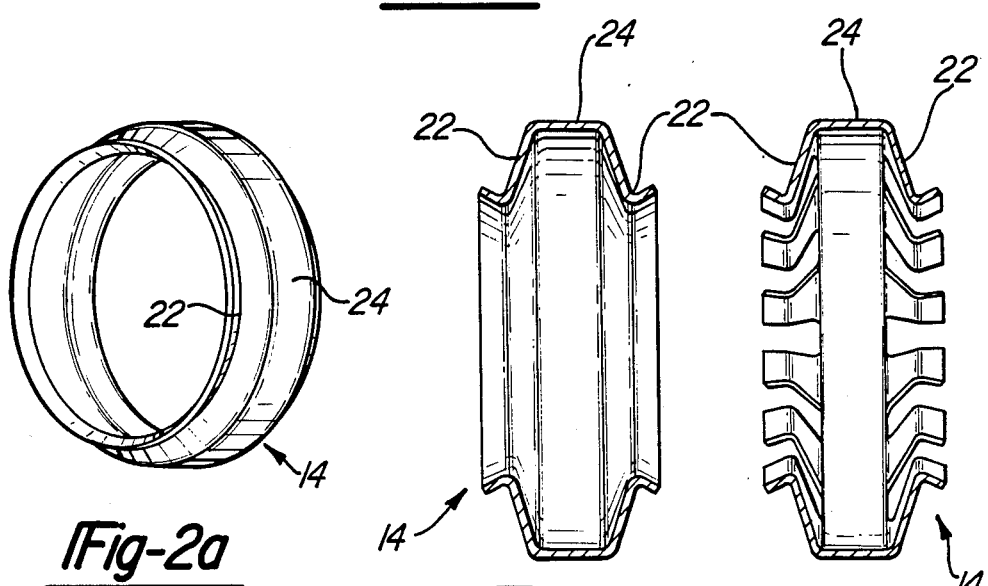
FIG. 2(a) is perspective view of a ring.
FIG. 2(b) is a cross-sectional view of the ring of FIG. 2(a)
FIG. 2(c) is a cross-sectional view of modified ring.

FIG. 2(a) shows the shape of rings 14 and 16, FIG. 2(b) showing a cross section of FIG. 2(a).

The cross sectional FIG. 2(b) shows that the ring is composed of leg portions 22 and outer ring portion 24. The ring material is intended to be metal, and depending on the alloy and type of metal, leg portions 22 may be continuous as shown in FIG. 2(b), or segmented as shown in FIG. 2(c).

Figure 3A:
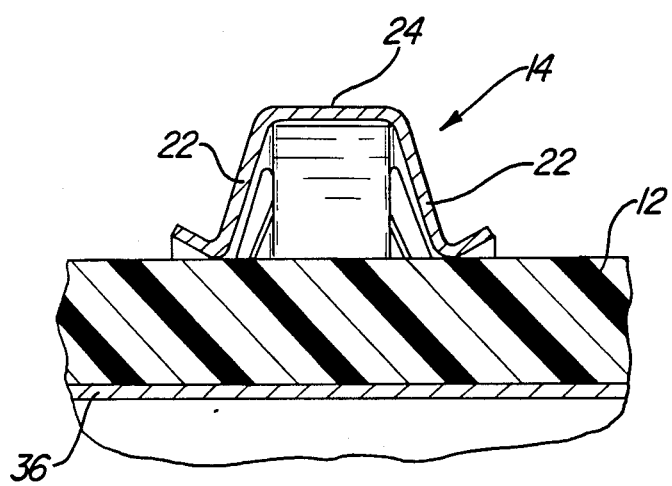
FIG. 3(a) is a cross-sectional view of the ring of FIG. 2(c) mounted on a plastic pipe with a sleeve therein.

FIG. 3(a) shows a portion of the ring of FIG. 2(c) installed over a portion of pipe 12. The ring is made so that it easily slides over pipe 12.

FIG. 3(b) shows the ring after closing or setting by means of a tool which drives the legs 22 toward each other. Also shown in FIG. 3(b) is a leg 22 pivot point "X", radius 26 of leg 22 when bent inward about pivot point "X", and arc 28 of legs 22 during closing or setting. Note that outer ring portion 24 will be very difficult to expand and legs 22 are very difficult to collapse, so that a very large compressive force is applied to pipe 12 by legs 22 at area 32 of pipe 12.

Dimensions of legs 22 and turned up area 34 of legs 22 are chosen such that closure or setting of legs 22 reduce the I.D. of the ring shown in FIG. 2(b) to a diameter somewhat less than the outside diameter of pipe 12, and so that legs 22 somewhat depress the material of pipe 12 in area 32. By turning outward the edges 34 of legs 22, the material of pipe 12 is not cut or damaged. The ring, being made from a metal, is much stronger than the material from which pipe 12 is made, and the depression or deformation at 32 results in a very secure anchoring of the ring to the pipe. Because of this anchoring, it is not possible to slide the ring along the pipe surface. In some cases, it is desirable to place a metal tubular structure 36 inside pipe 12 to reinforce pipe 12, as is also shown in FIG. 3(a).

FIG. 4 shows a simple tool which may be constructed so that the tool is split so that it may be installed around the pipe and removed after the ring is anchored. This tool must have means of squeezing the legs 22 together so that they anchor the ring as described above. The tool 50 is shown as a threaded device consisting of two male halves 52, and two mating female halves 62, which are split at planes 54 and 64.

In use, the ring is slid onto the pipe or assembled over the pipe, or secured over the pipe as a ring 16 with securing points 18 and 20 in FIG. 1. Securing points 18 and 20 act to provide the strong outer band element of 24 in FIG. 2.

The tool 50 is then assembled so that the ring 14 or 16 is surrounded by tool 50, with ring leg driving faces 66 and 68 contacting legs 22 of the ring. Screwing the male tool element 52 into the female tool element 62 by means of pin 60 being placed in holes 58 as a means of applying screwing torque. Tool 50 would be dimensioned so that when male member 52 is fully screwed into female 62, ring legs 22 will have been forced together as shown in FIG. 3(b).

There are, of course, many possible designs for manual and automatic tooling that can be used to close or set the rings.

Once the ring is positioned on the pipe at the desired location, it is possible to use the ring for any purpose that requires a means of applying a force directed along a direction parallel to the axis of the pipe.

Forces applied perpendicular to the axis direction of the pipe are easily applied by other means, but the ring may be designed to participate in the application of forces in this direction as well.

FIG. 5 shows a section of pipe 10 as in FIG. 1 that employs the rings 14 and 16 as part of an end sealing means and a locating means. A pressure sealing connection between the pipe and ring assembly 10 is to be accomplished to device 80. Device 80 has interior bores 82 to constrain the pipe assembly 10 to the axis of the device 80, and in the center of seal 88 which has been placed in bore 84. Seal 88 would thus seal the interior surface of bore 84 to the exterior surface of the pipe 12. In this embodiment, the ring 14 provides two functions. The first function is a means of preventing seal 8 from being expelled from bore 84 when pressure is confined in the system. The second function is to act as a means transferring pull-out forces that might be impressed on the pipe to the device 80 by means of engaging legs 86 of a retainer 90 which has been installed into device 80 through window portions 86 provided in device 80.

Abutting surfaces 94 of windows 86 operates against retainer 90 which operates against ring 14 which has been secured to pipe 12.

In this way, forces on pipe 12 which would remove pipe 12 from device 80 are resisted.

Further, along pipe 12, ring 16 has been positioned in means 96 which engage ring 16 to prevent unrestricted movement of pipe 12 in its axial direction.

It is understood that there are many means for making sealing contact to pipe 12 and many means of applying forces from a mating device to the ring placed on the pipe 12; the important factor is the ring which has been anchored or secured to the pipe. The ring has made it possible to easily use the pipe in a reliable low-cost manner.

I claim:

1. A method of providing means for enabling application of axial forces on a relatively deformable plastic conduit comprising the steps of:

(a) providing one or more metal rings comprised of an outer peripheral band portion having on the ends thereof oppositely axially inwardly extending deformable leg portions defining outwardly turned free edges with an inside diameter to enable said conduit to easily pass through;

(b) then inserting said conduit through said leg portions of said one or more rings; and (c) then deforming said leg portions axially toward one another such that said leg portions are positioned substantially directly under said outer peripheral band portion to reduce the inside diameter of said leg portions of said ring by said deforming such that said reduced inside diameter has a diameter less than the outside diameter of said conduit thereby applying a larger magnitude force to said conduit by said leg portions with said outwardly turned free edges preventing damage to said conduit to lock said leg portions to said conduit in a compressional relationship with the said outer band portion while maintaining said large forces in said compressional relationship on said conduit.

2. The method according to claim 5 further comprising positioning a sleeve inside said conduit at the position of said exterior ring before deforming said leg portions.

3. The method according to claim 1 wherein each of said leg portions are comprised of a plurality of segments.

* * * * *

UNITED STATES PATENT AND TRADEMARK OFFICE
CERTIFICATE OF CORRECTION

PATENT NO. : 4,852,239

DATED : August 1, 1989

INVENTOR(S) : Donald D. Bartholomew

It is certified that error appears in the above-identified patent and that said Letters Patent is hereby corrected as shown below:

Column 1, line 6,
"as" should be --is--

Column 1, line 36,
insert "a" after --is--

Column 1, line 39,
insert "a" after --of--

Column 1, line 46,
insert "of" after --view--

Column 2, line 62,
"8" should be --88--

Column 2, line 66,
"86" should be --92--

Column 4, line 11, claim 1,

"larger" should be --large--

UNITED STATES PATENT AND TRADEMARK OFFICE
CERTIFICATE OF CORRECTION

PATENT NO. : 4,852,239

DATED : August 1, 1989

INVENTOR(S) : Donald D. Bartholomew

It is certified that error appears in the above-identified patent and that said Letters Patent is hereby corrected as shown below:

Column 4, line 19,
"5" should be --1--

Signed and Sealed this

Twenty-first Day of August, 1990

Attest:

HARRY F. MANBECK, JR.

*Attesting Officer*　　　　　*Commissioner of Patents and Trademarks*